(12) United States Patent
Ganachaud et al.

(10) Patent No.: US 7,082,973 B2
(45) Date of Patent: Aug. 1, 2006

(54) SEALING AND SAFETY DEVICE FOR FILLING A HOLLOW BODY WITH A LIQUID

(75) Inventors: Patrick Ganachaud, Laval (FR); Jacques Covet, Gennes sur Glaize (FR)

(73) Assignee: Inergy Automative Systems Research (Societe Anonyme), Brussels (BE)

( * ) Notice: Subject to any disclaimer, the term of this patent is extended or adjusted under 35 U.S.C. 154(b) by 0 days.

(21) Appl. No.: 10/527,321

(22) PCT Filed: Sep. 12, 2003

(86) PCT No.: PCT/EP03/10193

§ 371 (c)(1),
(2), (4) Date: May 24, 2005

(87) PCT Pub. No.: WO2004/024488

PCT Pub. Date: Mar. 25, 2004

(65) Prior Publication Data

US 2005/0205160 A1    Sep. 22, 2005

(30) Foreign Application Priority Data

Sep. 13, 2002  (FR) .................................. 02 11465

(51) Int. Cl.
B65B 1/04 (2006.01)

(52) U.S. Cl. ..................................... 141/350; 220/86.2

(58) Field of Classification Search ................ 141/301, 141/349, 350, 198; 220/86.2
See application file for complete search history.

(56) References Cited

U.S. PATENT DOCUMENTS

| | | | |
|---|---|---|---|
| 3,334,779 A | 8/1967 | Smith | |
| 3,903,942 A | 9/1975 | Vest | |
| 4,598,741 A | 7/1986 | Johnson et al. | |
| 4,706,708 A * | 11/1987 | Fornuto et al. | 137/588 |
| 4,887,578 A | 12/1989 | Woodcock et al. | |
| 4,944,779 A * | 7/1990 | Szlaga et al. | 96/109 |
| 5,605,177 A | 2/1997 | Ohashi et al. | |
| 5,775,392 A | 7/1998 | Kraft | |
| 5,954,367 A | 9/1999 | Doll et al. | |
| 6,364,145 B1 | 4/2002 | Shaw et al. | |
| 6,732,759 B1 * | 5/2004 | Romanek et al. | 137/588 |
| 2004/0144443 A1 | 7/2004 | Ganachaud | |

* cited by examiner

*Primary Examiner*—Steven O. Douglas
(74) *Attorney, Agent, or Firm*—Oblon, Spivak, McClelland, Maier & Neustadt, P.C.

(57) ABSTRACT

Sealing and safety device made from flexible elastomer material, for filling a hollow body with a liquid using a delivery nozzle, comprising an annular seal for surrounding the nozzle and preventing the exit of gases from the hollow body and also a valve capable of opening, in the event of excess overpressure in the hollow body, only towards the external atmosphere so as to create a passage allowing the escape of liquid and/or of gas.

14 Claims, 5 Drawing Sheets

SEALING AND SAFETY DEVICE FOR FILLING A HOLLOW BODY WITH A LIQUID

Figure 1:
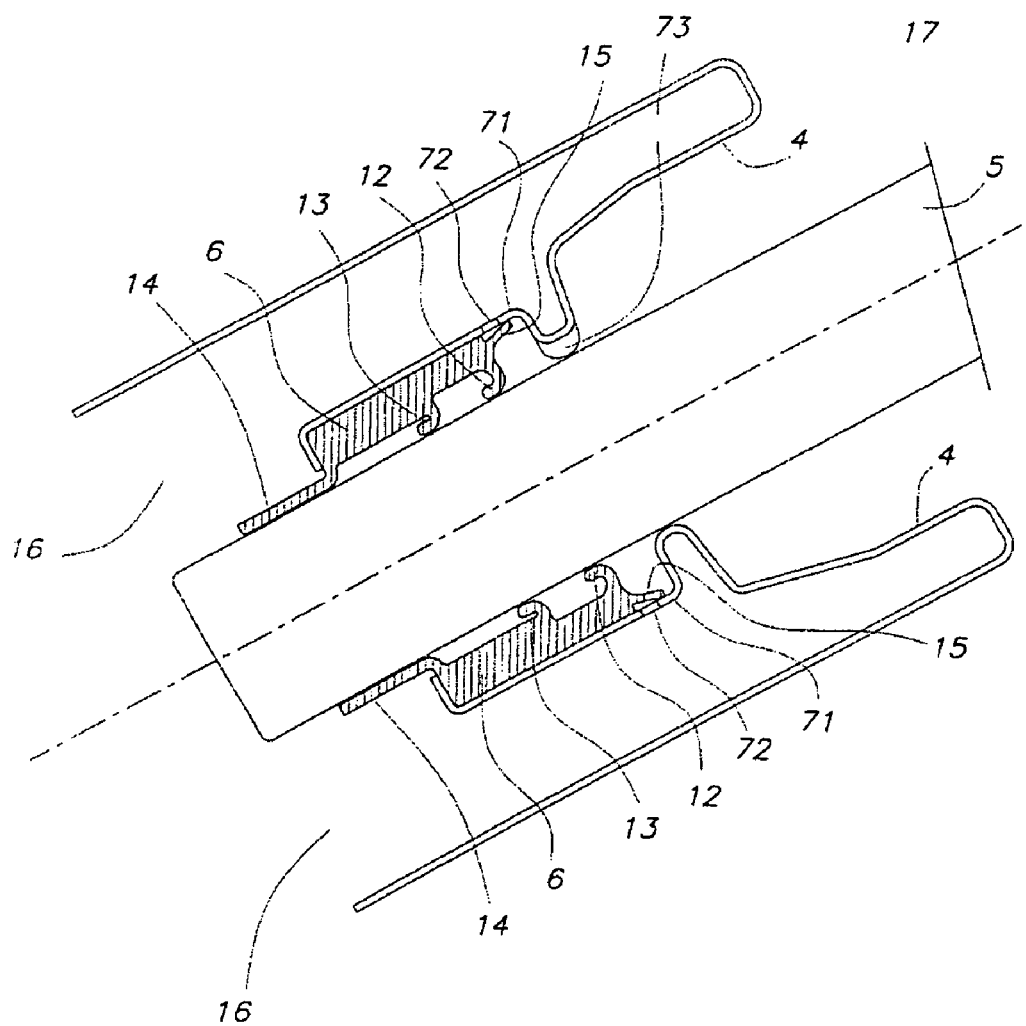

The present invention relates to a sealing and safety device for filling a hollow body with a liquid.

A number of safety systems for fuel tanks have been described, addressing, generally speaking, the solution of problems linked to degassing of the tank during filling thereof and its venting to the air during a normal period of rest and of functioning of the engine that is consuming said fuel. In addition to these problems, there is an increasingly imperious need, regarding respect for the environment, to recover the vapours that are released during the above-mentioned operations, while minimizing leakages to the atmosphere.

Various systems that achieve reasonably complete sealing between a delivery nozzle and a filling orifice of a tank are known. Patent U.S. Pat. No. 3,334,779, for example, discloses a diaphragm made from flexible material that is slit into three segments. Pushing the nozzle in opens the diaphragm and separates the segments on the inner wall of the filler neck, where they act as a seal for the delivery nozzle.

The known systems, however, present a number of disadvantages:
creation of an overpressure in the tank, giving rise to returns of liquid in the filler neck;
absence of recovery of liquid vapours via the nozzle;
no protection in the event of surges in the tank.

An object of the invention is to remedy the drawbacks of known systems and to provide a system that manages rapid increases in pressure in the tank while maintaining the system's small overall size and a low cost of the same order of magnitude or less than that of existing conventional systems.

To this end, the invention relates to a sealing and safety device made from flexible elastomer material, for filling a hollow body with a liquid using a delivery nozzle, comprising at least one annular seal for surrounding the nozzle and preventing the exit of gases from the hollow body, according to which it also comprises at least one valve capable of opening, in the event of excess overpressure in the hollow body, only towards the external atmosphere so as to create a passage allowing the escape of liquid and/or of gas from the inside of the hollow body towards said external atmosphere.

The invention relates to a sealing and safety device. "Sealing device" is understood to denote any device capable of isolating the internal atmosphere of a hollow body from the ambient atmosphere. "Isolate" is understood to denote, in this case, allowing only a slight leakage during use of the device. The permitted leakage level is regulated during fitting of the sealing and safety device so that, at a test pressure of 40 mbar relative to atmospheric pressure, the leakage does not exceed 20 l/hour and, preferably, 12 l/hour.

The device according to the invention is also a safety device, i.e. a system for storing and handling a liquid in a tank in a manner that is safe for the user and for the environment. Such a system shields the user from any hazardous situation, particularly any risks of explosion, implosion, combustion or pollution, while maintaining the external environment free of any leakage of liquid or emanation of undesirable gases.

According to the invention, the sealing and safety device is produced in a flexible elastomer material, i.e. a material that is able to deform elastically through the influence of a mechanical stress.

All categories of elastomer materials are suitable, such as, for example, natural elastomers, such as rubber, and the various synthetic elastomers. Of the latter, artificial rubbers, and synthetic copolymers and polymers having elastomeric properties are especially suitable. A blend of a number of polymers and/or copolymers may also be suitable in so far as at least one of the components of the blend has elastomeric properties. Examples of such materials are butadiene-styrene resins, optionally combined with a third component, thermoplastic polymers such as polyolefin elastomers or olefin elastomer copolymers.

The device according to the invention is for filling a hollow body. "Hollow body" is understood to mean any structure whose surface has at least one void or concave part. Preferably, "hollow body" denotes in this case a closed structure for containing a liquid and/or a gas. Vats and tanks are particularly preferred. The hollow bodies according to the invention are particularly well suited to their use as a fuel tank, particularly those present on—or designed for equipping—motor vehicles.

The liquid filling the hollow body may any type of inorganic and/or organic liquid. In particular, it may contain at least one dissolved substance.

The device according to the invention is well suited to the filling of tanks with liquids whose volatility at ambient temperature is greater than the volatility of water and of aqueous solutions. It is particularly well suited to filling fuel tanks with a liquid fuel such as a gasoline or diesel.

According to the invention, the hollow body is filled using a liquid-delivery nozzle. Such a nozzle controls the arrival and the delivery of liquid entering the hollow body. It is generally also provided with a system for automatic triggering and shutoff of the delivery of liquid when the hollow body is almost full.

According to the invention, the device comprises at least one annular seal for surrounding the nozzle. This annular seal comprises at least one lip made from elastomer material that folds back on the outer surface of the nozzle spout pipe. A device with two annular lips has afforded good results.

The annular seal is designed to oppose the exit of gases from the hollow body. It is understood that a minimum leakage defined above in terms of sealing is permitted.

According to the invention, the sealing device also comprises at least one valve capable of opening, in the event of excess overpressure in the hollow body, only towards the external atmosphere so as to create a passage allowing the escape of liquid and/or of gas from the inside of the hollow body towards said external atmosphere.

"Excess overpressure" is understood to mean an accidental overpressure that arises rapidly, such as is produced in the event of failure of the automatic triggering system of the nozzle during filling. Such an excess overpressure may also arise in extreme abnormal situations such as rapid, high temperature rises in the event of fire or explosion, for example. The function of this valve is to preserve the integrity of the hollow body and to prevent any bursting of or damage to the hollow body during such accident situations.

When it opens, the valve creates a passage to the external atmosphere in the immediate vicinity of the hollow body.

A particular embodiment of the valve according to the invention is that of an annular lip made from elastomer material. In this embodiment, one end of the lip may be integral with the sealing device and its other end may bear with elastic force on a rigid element bordering the passage. "Rigid" is understood to mean the condition of a material that is not elastic.

In the open position, the lip preferably uncovers an orifice that allows the flow of the liquid and/or of the gas. This orifice may be pierced in a rigid part close to the passage. The orifice preferably allows a flow of liquid and/or gas in an initial direction perpendicular to the axis of the delivery nozzle.

Also, the rigid element preferably borders the orifice. Most preferably, this rigid element delimits the orifice, constituting its entire circumference.

Another particular embodiment of the valve according to the invention is that of a non-return flap valve. The flap valve may be independent of the annular seal. It is advantageously located close to the dispensing nozzle when the latter is engaged in the sealing and safety device according to the invention. All forms of non-return flap valves that are compatible with the environment of the passage may be used.

One example of a non-return flap valve that is particularly suitable is that of a membrane made from elastomer material in the form of an inverted umbrella.

An interesting variant embodiment of the device according to the invention is that in which the device also comprises, on the hollow body side, an obturator made from elastomer material. The obturator is arranged downstream of the device, in the direction of insertion of the delivery nozzle. It may have any shape that is compatible with the sealing and safety device. One example that has afforded good results is an obturator formed by a diaphragm made from elastomer material, such as that formed by a disc of such material slit into at least four segments.

The device according to the invention is most particularly suited to hollow bodies that are tanks, for example fuel tanks, such as those found on motor vehicles.

When the hollow bodies are such fuel tanks, the device according to the invention may advantageously be incorporated into a guide for the fuel-delivery nozzle. A guide of this type is generally inserted into the top of a filler neck of a fuel tank. Its function is correctly to position the nozzle in the top of the neck to allow problem-free filling. Accessorily, it is generally provided also with a mechanical polarizing device with a view to preventing any filling with a grade of fuel unsuitable for the vehicle in question. The guide may be made from various materials, including metals and rigid plastics. Preferably, it is made from rigid plastic.

In the latter embodiment, in which the device according to the invention is a part of a nozzle guide, the guide may itself be incorporated into a wider fuel system that comprises a tank and a degassing and venting-to-the-air flap valve. The device is very suitable when the overall fuel system also comprises a breather pipe for breathing of the vapours and for fixing the maximum liquid level in the tank. This pipe connects the top part of the tank to the upper part of the filler neck, downstream of the sealing device, on the tank side. In this fuel system, the degassing and venting-to-the-air flap valve is often a float valve. The float line of the float is generally adjusted so that the flap valve is open only in two circumstances, namely when the tank is inclined beyond a predetermined limit, or even completely inverted, and during a transitory movement of the fuel whose extent exceeds a predetermined value.

In this fuel system, the breather pipe for breathing of the vapours and for fixing the maximum level that connects the top part of the tank to the upper part of the filler neck, may be largely located outside the volume of the tank and that of the filler neck. In this case, this pipe penetrates, at one of its ends, the upper wall of the tank and enters into the top part of it. Also, at its other end, it penetrates the filler neck, downstream of the sealing system.

In a variant embodiment, the breather pipe for beathing of the vapours and for fixing the maximum level may be located entirely inside the volume of the tank and that of the filler neck.

In the two above-described variant embodiments, the breather pipe for breathing of the vapours and for fixing the maximum level preferably has a diameter that is sufficiently large to allow total aspiration of the gases present in the tank via the nozzle.

Another variant embodiment that is compatible with the preceding ones, is that in which the breather pipe for breathing of the vapours and for fixing the maximum level opens out into the top part of the tank via a float valve, different from the degassing and venting-to-the-air flap valve, which closes the passage when the maximum level of liquid is reached in the tank.

The following FIGS. 1 to 4 aim to illustrate the invention without limiting its scope in any way.

FIG. 1 illustrates a section through a sealing and safety device (6) made from elastomer material, incorporated into a high-density polyethylene (HDPE) guide (4). A delivery nozzle (5) is inserted into the guide (4) and traverses the device (6). An annular seal comprising two lips (12, 13) in elastomer material, which fold down on the outer surface of the pipe of the spout of the nozzle (5), guarantees leaktightness. An obturator in the form of a diaphragm (14) extends the device (6) downstream and is illustrated in the position in which it has been opened by means of the nozzle (5) having been pushed in.

A valve having the form of an annular lip (15) made from elastomer material is integral with the device (6) and extends it upstream. In the normal position, the annular lip (15) rests closed on a rigid edge (71) formed of part of the guide (4). It covers an annular orifice (72) pierced in a rigid part of the guide (4). The form of the guide (4) in the vicinity of the nozzle upstream of the sealing and safety device (6) provides a space (73) for the escape of gas and/or liquid.

In the event of an accidental surge on the inside (16) of the filler neck, the lip (15) opens and uncovers the orifice (72), thus allowing the creation of a passage for gases and/or liquid, in an initial direction perpendicular to that of the axis of the nozzle (5), which then escape via the space (73) in order, finally, to reach the external atmosphere (17) above the top of the guide (4).

Figure 2:
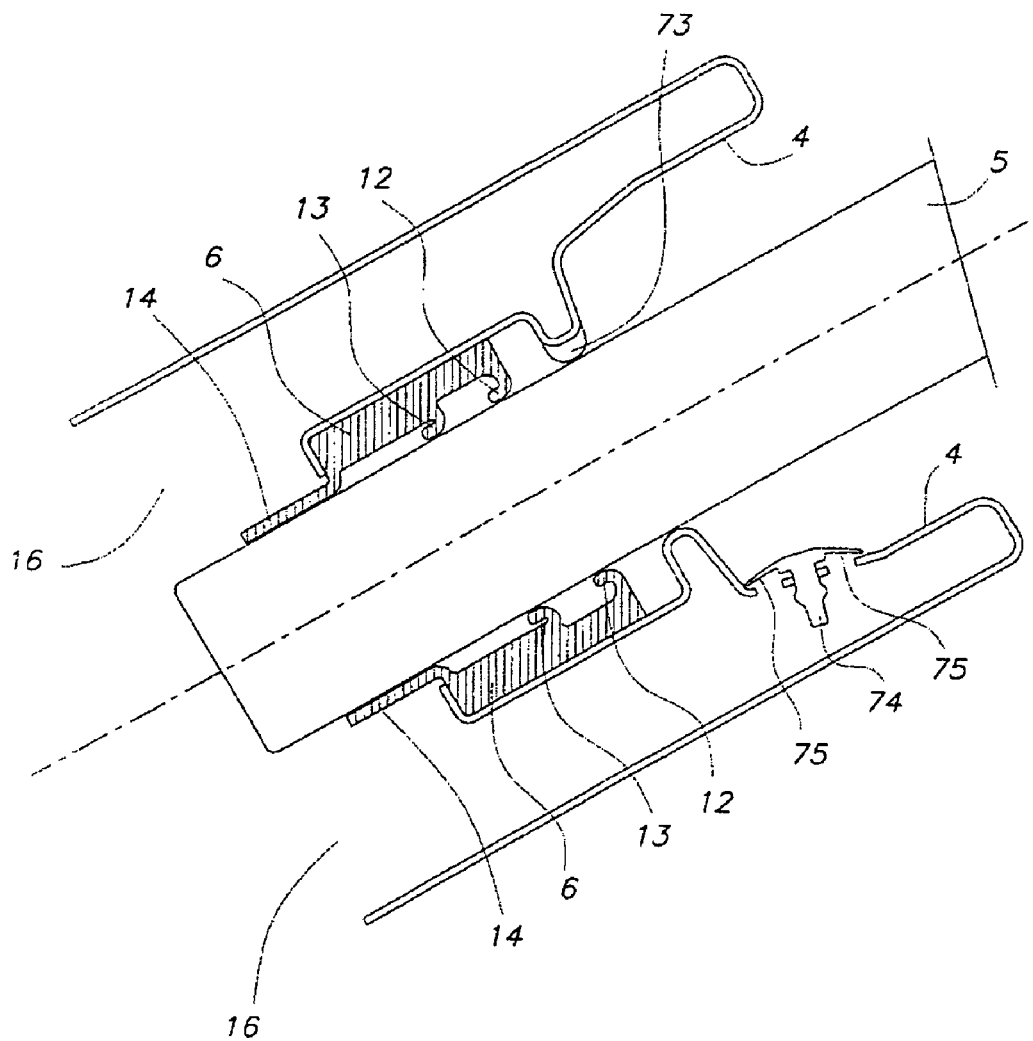

FIG. 2 illustrates a section through another variant embodiment of a sealing and safety device (6) according to the invention. In this variant embodiment, the orifice and the annular lip of FIG. 1 have been replaced by a valve in the form of a non-return flap valve (74) in the form of an upturned umbrella made from elastomer material. The end of the circumference of the umbrella (75) acts as a flexible circular lip that opens through the influence of too-high a pressure on the inside (16) of the neck.

Figure 3:
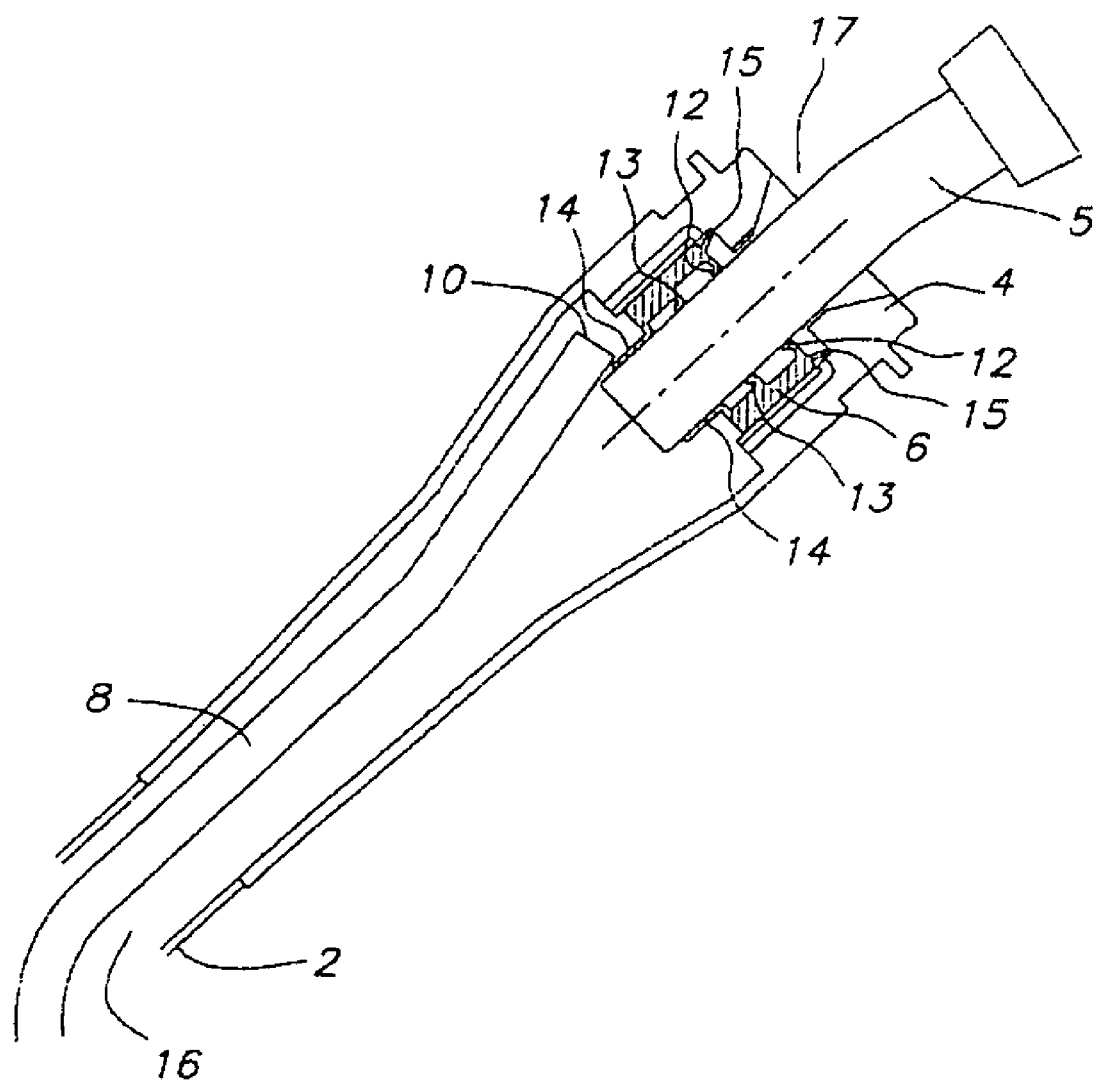

FIG. 3 shows a section through the top of a filler neck (2) comprising the sealing and safety device (6) according to the invention. It shows a breather pipe (8) for the vapours arranged inside the neck (2).

Figure 4:
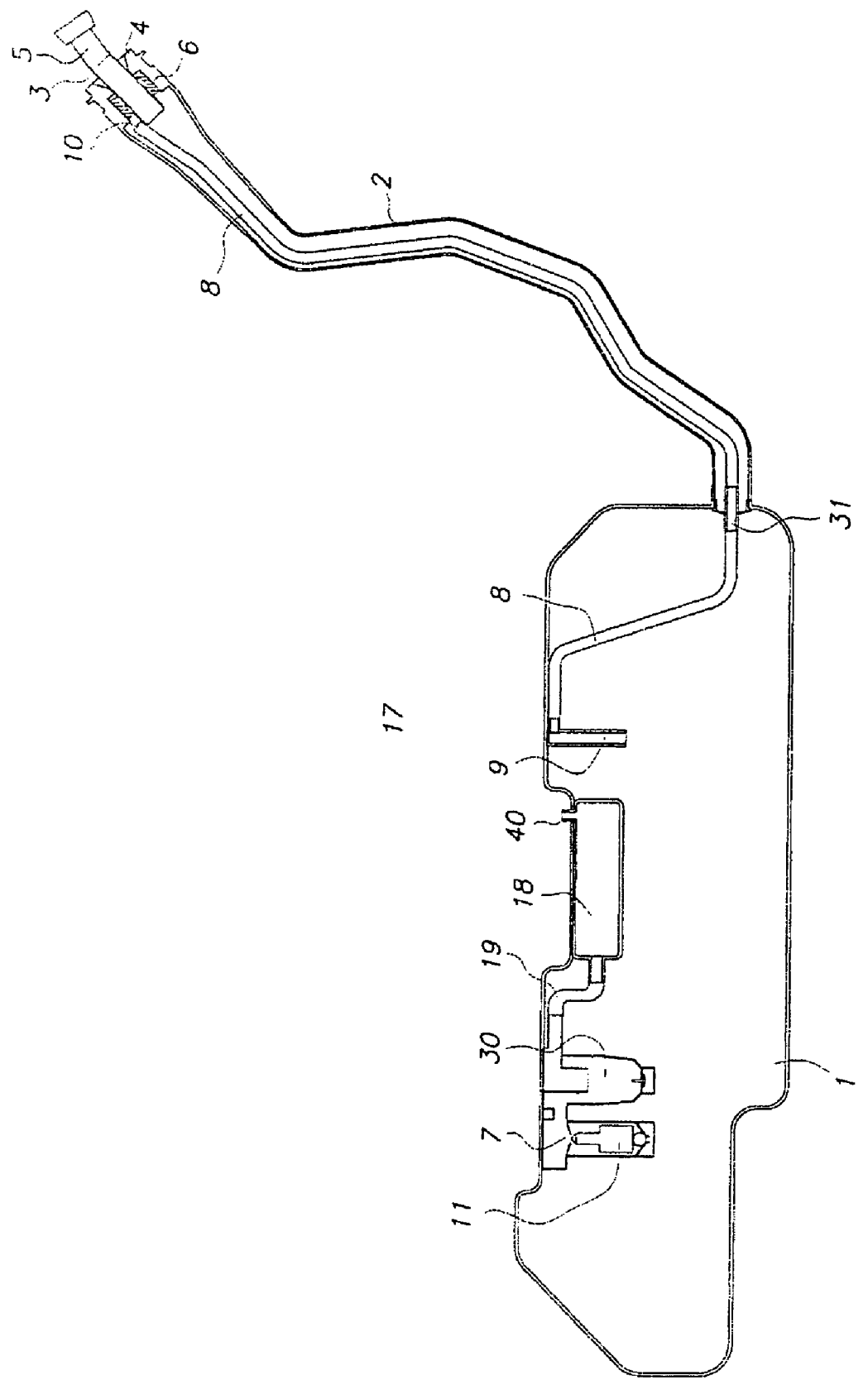

FIG. 4 illustrates a wider fuel system that comprises the top of the filler neck (2), and also a fuel tank (1), a flap valve (7) with float (11) which is normally open, provided with a liquid-trapping volume (30) and a canister (18). A breather pipe (8) for breathing of the vapours and for fixing the maximum level is separated into two parts ending on either side of a non-return flap valve (31) designed to prevent exits of liquid from the tank (1) in the neck (2). In the tank (1), the pipe (8) is extended by a siphon that ends in a section (9) entering the top of the tank and fixing the maximum permitted level of liquid.

Figure 5:
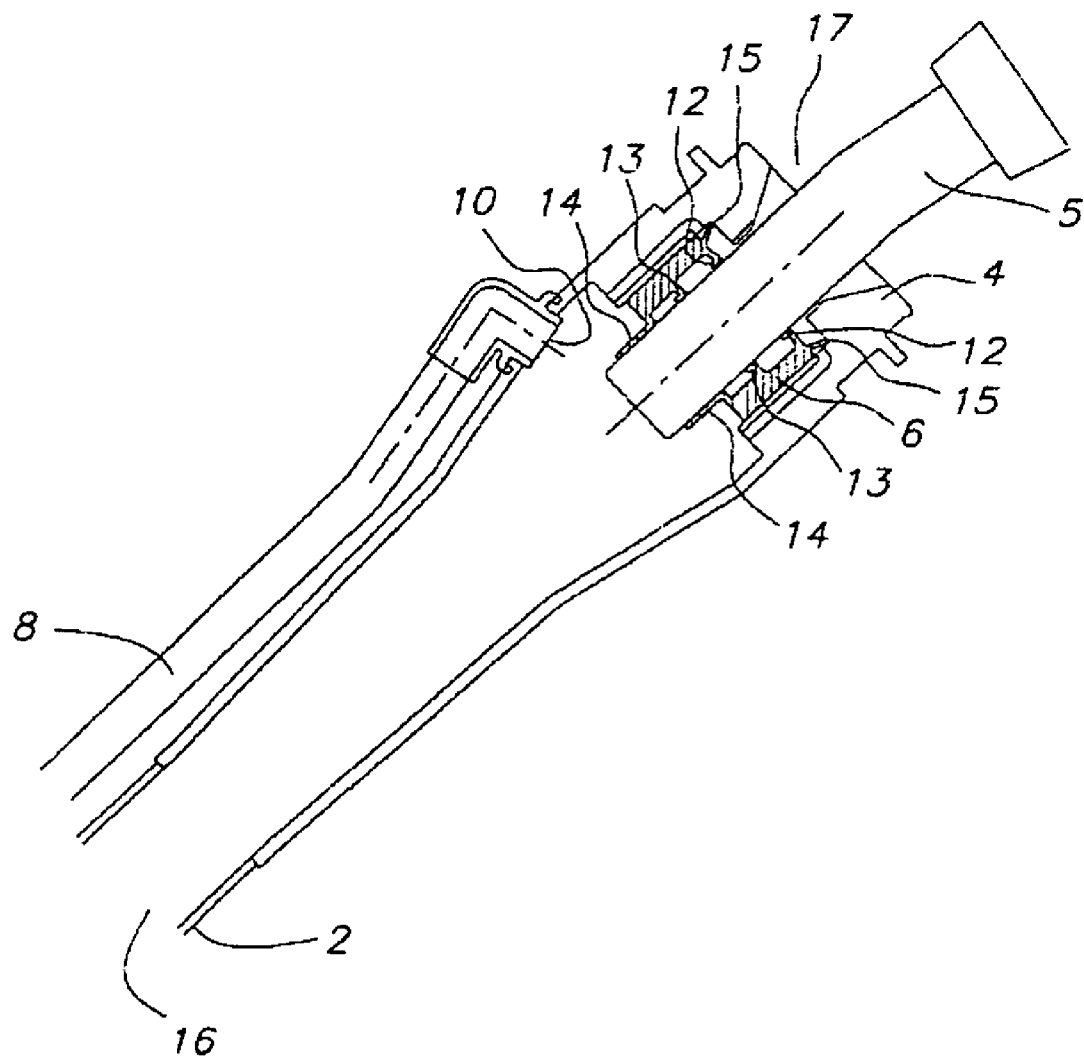

FIG. 5 illustrates a variant embodiment of the top of the filler neck (2) in which the breather pipe (8) for breathing of the vapours and for fixing the maximum level is located outside the volume of this neck. In this variant embodiment, the pipe (8) remains outside the tank (not shown) over a major part of its length, penetrates the upper wall of the latter and enters the top of the inner volume as far as the maximum permitted level of liquid.

The invention claimed is:

1. A sealing and safety device made from flexible elastomer material, for filling a hollow body with a liquid using a delivery nozzle, comprising at least one annular seal for surrounding the nozzle and preventing the exit of gases from the hollow body and at least one valve capable of opening, in the event of excess overpressure in the hollow body, only towards external atmosphere so as to create a passage allowing an escape of at least one of liquid and gas from inside of the hollow body directly to the external atmosphere, the valve being a non-return flap valve, independent of the annular seal, that is located close to the nozzle, wherein the non-return flap valve has the form of an inverted umbrella and is made from elastomer material.

2. The device according to claim 1, which also comprises, on the hollow body side, a diaphragm made from elastomer material.

3. The device according to claim 1, wherein the hollow body is a fuel tank.

4. The device according to claim 3, which is incorporated into a guide, made from rigid plastic, for a fuel-delivery nozzle inserted into the top of a filler neck of the fuel tank.

5. A sealing and safety device made from flexible elastomer material, for filling a hollow body with a liquid using a delivery nozzle, comprising at least one annular seal for surrounding the nozzle and preventing the exit of gases from the hollow body and at least one valve capable of opening, in the event of excess overpressure in the hollow body, only towards the external atmosphere so as to create a passage allowing an escape of at least one of liquid and gas from inside of the hollow body towards external atmosphere, the valve being a non-return flap valve, independent of the annular seal, that is located close to the nozzle, wherein the non-return flap valve has the form of an inverted umbrella and is made from elastomer material, wherein the hollow body is a fuel tank, wherein the device is incorporated into a guide, made from rigid plastic, for a fuel-delivery nozzle inserted into the top of a filler neck of the fuel tank, and wherein the guide is itself incorporated into a wider fuel system that comprises a tank, a flap valve with float for degassing during filling and venting to the air during operation and a pipe for breathing of the vapors and for fixing the maximum liquid level in the tank, connecting the top part of this tank to the upper part of the filler neck, downstream of the sealing device, on the tank side, and in which the flap valve is normally open during filling of the tank and during periods of operation and the float line of the float is adjusted so that the flap valve is closed only in two circumstances, when the tank is inclined beyond a predetermined limit and during a transitory movement of the fuel whose extent exceeds a predetermined value.

6. The device according to claim 5, wherein the breather pipe for the vapors that connects the top part of the tank to the upper part of the filler neck is located entirely inside the volume of the tank and that of the filler neck.

7. A sealing device for filling a body with a liquid using a nozzle, comprising:

an annular seal configured to surround the nozzle to prevent a gas from escaping from the body; and a valve configured to vent the liquid or the gas from the body directly to atmosphere when a pressure of the liquid or the gas in the body exceeds a predetermined pressure, the valve comprising a non-return valve, and the valve being independent of the annular seal.

8. The sealing device according to claim 7, wherein at least one of the valve and the annular seal comprises an elastomer material.

9. The sealing device according to claim 7, wherein each of the valve and the annular seal comprises an elastomer material.

10. The sealing device according to claim 7, wherein the annular seal comprises at least one annular lip configured to limit the gas from escaping from the body between the nozzle and the annular seal.

11. The sealing device according to claim 7, wherein the annular seal comprises at least two annular lips, each of the annular lips configured to limit the gas from escaping from the body between the nozzle and the annular seal.

12. The sealing device according to claim 7, further comprising:

a guide in which the annular seal and the valve are disposed, the guide comprising an opening configured to receive the nozzle therein.

13. The sealing device according to claim 12, wherein the valve is disposed closer to the opening than the annular seal.

14. The sealing device according to claim 7, wherein the valve is configured to vent the liquid or the gas from the body directly to atmosphere without equalizing pressure on both sides of the valve.

\* \* \* \* \*